(12) United States Patent
Jing et al.

(10) Patent No.: US 7,638,581 B2
(45) Date of Patent: Dec. 29, 2009

(54) FLUOROPOLYMER NANOPARTICLE COATING COMPOSITION

(75) Inventors: Naiyong Jing, Woodbury, MN (US);
Tatsuo Fukushi, Woodbury, MN (US);
Chuntao Cao, Woodbury, MN (US);
Lan H. Liu, Rosemount, MN (US);
Thomas P. Klun, Lakeland, MN (US);
William D. Coggio, Hudson, WI (US);
Vivian W. Jones, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 431 days.

(21) Appl. No.: 11/305,978

(22) Filed: Dec. 19, 2005

(65) Prior Publication Data
US 2006/0148971 A1   Jul. 6, 2006

Related U.S. Application Data

(60) Provisional application No. 60/640,837, filed on Dec. 30, 2004, provisional application No. 60/640,744, filed on Dec. 30, 2004.

(51) Int. Cl.
*C08L 27/12* (2006.01)
(52) U.S. Cl. ............... 525/199; 524/500; 524/501; 524/502; 524/520; 525/191
(58) Field of Classification Search .......... 525/199, 525/191; 524/500, 501, 502, 520
See application file for complete search history.

(56) References Cited

U.S. PATENT DOCUMENTS 2,866,721 A   12/1958   Hetherington 3,075,939 A   1/1963   Bauer Jr. et al.
3,291,864 A   12/1966   Eldridge et al.
3,484,503 A   12/1969   Magner et al.
4,339,553 A   7/1982   Yoshimura et al.
4,503,179 A   3/1985   Yoshimura et al.

(Continued)

FOREIGN PATENT DOCUMENTS

EP            0 168 020         1/1986

(Continued)

OTHER PUBLICATIONS

Owens et al. J. Appl. Polym. Sci., vol. 13, 1741, (1969).

(Continued)

*Primary Examiner*—Peter D. Mulcahy
*Assistant Examiner*—Henry Hu
(74) *Attorney, Agent, or Firm*—Jean A. Lown

(57) ABSTRACT

A fluoropolymer coating composition contains a homogeneous mixture of crystalline submicron fluoropolymer particles dispersed in a solvent-borne solution of less crystalline or amorphous fluororesin. The composition may be prepared by blending a latex containing crystalline submicron fluoropolymer particles with a latex containing less crystalline or amorphous fluororesin particles, coagulating and drying the blended latices, and dissolving the dried blend in a solvent for the fluororesin particles. Quasi-homogenous compositions may be prepared by blending dry crystalline submicron fluoropolymer particles with a) dry less crystalline or amorphous fluororesin particles and a solvent for the fluororesin particles, or b) a solvent-borne solution of less crystalline or amorphous fluororesin. Rubbing the disclosed coatings can provide a thin, continuous or nearly continuous fluoropolymer surface layer atop a less crystalline or amorphous fluororesin binder containing crystalline submicron fluoropolymer particles.

25 Claims, 5 Drawing Sheets

U.S. PATENT DOCUMENTS

| | | | |
|---|---|---|---|
| 4,713,418 A | 12/1987 | Logothetis et al. | |
| 4,879,362 A | 11/1989 | Morgan | |
| 4,904,726 A | 2/1990 | Morgan et al. | |
| 5,006,594 A | 4/1991 | Rees | |
| 5,109,071 A | 4/1992 | Johnson et al. | |
| 5,180,470 A | 1/1993 | Smith et al. | |
| 5,194,335 A | 3/1993 | Effenberger et al. | |
| 5,376,503 A * | 12/1994 | Audett et al. | 430/270.1 |
| 5,647,400 A | 7/1997 | Jani et al. | |
| 5,772,755 A | 6/1998 | Hegenbarth et al. | |
| 5,880,204 A * | 3/1999 | McCarthy et al. | 524/520 |
| 5,922,468 A * | 7/1999 | Huesmann et al. | 428/422 |
| 6,117,555 A | 9/2000 | Fujimori et al. | |
| 6,160,053 A | 12/2000 | Enokida et al. | |
| 6,299,799 B1 | 10/2001 | Craig et al. | |
| 6,310,141 B1 * | 10/2001 | Chen et al. | 525/199 |
| 6,310,142 B1 * | 10/2001 | Apostolo et al. | 525/200 |
| 6,395,834 B1 * | 5/2002 | Albano et al. | 525/199 |
| 6,417,280 B2 | 7/2002 | Effenberger et al. | |
| 6,429,249 B1 | 8/2002 | Chen et al. | |
| 6,444,741 B1 | 9/2002 | Chen et al. | |
| 6,476,144 B1 | 11/2002 | Okanishi et al. | |
| 6,592,977 B2 | 7/2003 | Thomas et al. | |
| 6,660,798 B1 | 12/2003 | Marchese et al. | |
| 6,664,336 B1 | 12/2003 | Tomihashi et al. | |
| 6,734,254 B1 | 5/2004 | Worm et al. | |
| 6,756,445 B1 | 6/2004 | Irie et al. | |
| 7,019,083 B2 * | 3/2006 | Grootaert et al. | 525/276 |
| 2002/0001681 A1 | 1/2002 | Arai et al. | |
| 2003/0198769 A1 | 10/2003 | Jing et al. | |
| 2004/0019176 A1 | 1/2004 | Araki et al. | |
| 2004/0241323 A1 | 12/2004 | Ylitalo et al. | |
| 2004/0241395 A1 | 12/2004 | Jing et al. | |
| 2005/0282969 A1 * | 12/2005 | Comino et al. | 525/326.2 |

FOREIGN PATENT DOCUMENTS

| | | |
|---|---|---|
| EP | 0494082 | 7/1992 |
| EP | 0 670 868 | 11/1993 |
| EP | 0 708 797 | 7/1994 |
| EP | 1184417 | 3/2002 |
| JP | 47-18346 | 9/1972 |
| JP | 57-107336 | 3/1982 |
| JP | 58-90955 | 5/1983 |
| JP | 01-182388 | 7/1989 |
| JP | 02 261850 | 1/1991 |
| JP | 08-295845 | 12/1996 |
| JP | 10-88061 | 4/1998 |
| JP | 11-269426 | 5/1999 |
| WO | WO 01/77226 | 10/2001 |

OTHER PUBLICATIONS

Wittmann et al., Highly oriented thin films of poly(tetrafluoroethylene)as a substitute for oriented growth of materials, Nature, 352, pp. 414-417 (1991).

Wood et al., Predicting the exterior durability of new fluoropolymer coatings, J Fluorine Chem., 104, pp. 63-71 (2000).

* cited by examiner

US 7,638,581 B2

FLUOROPOLYMER NANOPARTICLE COATING COMPOSITION

STATEMENT OF PRIORITY

This application claims the priority of U.S. Provisional Application Nos. 60/640,837 and 60/640,744 filed Dec. 30, 2004, the entire contents of which are hereby incorporated by reference.

FIELD OF THE INVENTION

This invention relates to fluoropolymer nanoparticles.

BACKGROUND

Compositions containing fluorinated materials are mentioned or disclosed in, for example, U.S. Pat. Nos. 3,484,503, 4,339,553, 4,503,179, 4,713,418, 4,879,362, 4,904,726, 5,006,594, 5,109,071, 5,180,470, 5,194,335, 5,647,400, 5,772,755, 6,117,555, 6,160,053, 6,310,141 B1, 6,310,142 B1, 6,395,834 B1, 6,417,280 B2, 6,429,249 B1, 6,444,741 B1, 6,476,144 B1, 6,592,977 B2, 6,660,798 B1, 6,664,336 B1, 6,734,254 B1, 6,756,445 B1; U.S. Patent Application Publication Nos. US 2003/0198769 A1, US 2004/0019176 A1, US 2004/0241323 A1 and US 2004/0241395 A1; European Patent Nos. EP 0 168 020 B1, EP 0 670 868 B1 and EP 0 708 797 B1; International Application No. WO 01/77226 A1; Japanese Published Patent Application Nos. JP 47-18346, JP 57-107336, JP 58-90955, JP 01-182388, JP 08-295845, JP 10-88061 and JP 11-269426; Morgan et al., *Reinforcement with Fluoroplastic Additives*, Rubber World (May, 1991), Whitman et al., *Highly oriented thin films of poly(tetrafluoroethylene) as a substitute for oriented growth of materials*, Nature, 352, pp. 414-417 (1991) and Wood et al., *Predicting the exterior durability of new fluoropolymer coatings*, J. Fluorine Chem., 104, pp. 63-71 (2000).

SUMMARY OF THE INVENTION

The present invention provides in one aspect a method for making a fluoropolymer coating composition, comprising blending a latex containing crystalline submicron fluoropolymer particles with a latex containing less crystalline or amorphous fluororesin or fluoroplastic (collectively referred to below as "fluororesin") particles, coagulating and drying the blended latices, and dissolving the dried blend in a solvent for the fluororesin particles. The invention provides in another aspect a method for making a fluoropolymer coating composition, comprising blending dry crystalline submicron fluoropolymer particles with a) dry less crystalline or amorphous fluororesin particles and a solvent for the fluororesin particles, or b) a solvent-borne solution of less crystalline or amorphous fluororesin, thereby forming a coating composition containing a quasi-homogenous dispersion of the fluoropolymer particles in a solvent-borne solution of the fluororesin particles. The invention provides in yet another aspect a fluoropolymer coating composition comprising a homogeneous storage-stable mixture of crystalline submicron fluoropolymer particles dispersed in a solvent-borne solution of less crystalline or amorphous fluororesin. The invention provides in a further aspect a fluoropolymer coating composition comprising a quasi-homogeneous mixture of crystalline submicron fluoropolymer particles dispersed in a solvent-borne solution of less crystalline or amorphous fluororesin. The invention provides in yet another aspect an article comprising a hardened or cured thin, continuous or nearly continuous fluoropolymer layer, atop a less crystalline or amorphous fluororesin binder layer containing crystalline submicron fluoropolymer particles, atop a support.

These and other aspects of the invention will be apparent from the accompanying drawing and this specification. In no event, however, should the above summaries be construed as limitations on the claimed subject matter, which subject matter is defined solely by the attached claims, as may be amended during prosecution.

BRIEF DESCRIPTION OF THE DRAWING

Like reference symbols in the various drawings indicate like elements. The elements in the drawing are not to scale.

DETAILED DESCRIPTION

Figure 1A:
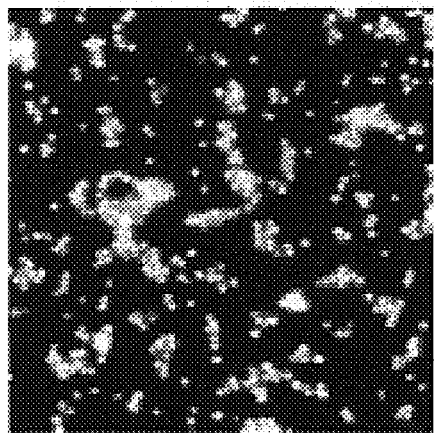
FIG. 1a (height image) and FIG. 1b (phase image) are atomic microscopy photomicrographs for the Example 1 coating before rubbing.

The words "a", "an", and "the" are used interchangeably with "at least one" to mean one or more of the elements being described. By using words of orientation such as "atop", "on", "uppermost", "underlying" and the like for the location of various elements in the disclosed coated articles, we refer to the relative position of an element with respect to a horizontally-disposed, upwardly-facing support. We do not intend that the disclosed articles should have any particular orientation in space during or after their manufacture.

When used with respect to the disclosed coating compositions, the word "polymer" refers to polymers, copolymers (e.g. polymers formed or formable from two or more different monomers), oligomers and combinations thereof.

When used with respect to the disclosed coating compositions, the word "fluoropolymer" refers to a highly-fluorinated or perfluorinated polymeric material that does not dissolve to the extent of at least 1 wt. %, at room temperature and standard pressure, in a hydrogen-containing organic liquid (e.g., it does not dissolve in any of methyl ethyl ketone ("MEK"), tetrahydrofuran ("THF"), ethyl acetate or N-methyl pyrrolidinone ("NMP")). The phrase "less crystalline or amorphous fluororesin" refers to a fluororesin material that will dissolve in a hydrogen-containing organic liquid (e.g., in one or more of MEK, THF, ethyl acetate or NMP), such fluororesin material having a less crystalline structure (as indicated by a peak crystalline melting point, $T_m$, determined using differential scanning calorimetry) than the fluoropolymer with which it is combined in the disclosed compositions, or having an amorphous structure (as indicated by having no measurable crystalline melting point as determined using differential scanning calorimetry). For brevity, a "less crystalline or amorphous fluororesin" will usually be referred to below merely as a "fluororesin". The terms "dissolve" and "solution" refer not only to dissolution to form a solution in the conventional sense and also to the formation of submicron-scale, e.g., nanoscale, suspensions.

When used with respect to the disclosed coating compositions, the word "solvent" refers to a hydrogen-containing organic liquid that can dissolve the fluororesin. The term "solvent-borne" refers to a coating composition that contains one or more volatile solvents which act as a carrier for other ingredients in the composition and enable such other ingredients to be applied in thin-film form on a suitable support. The disclosed solvent-borne coating compositions may also contain other organic liquids that cannot alone dissolve the fluororesin, and may also contain water, provided that the weight amount of such other organic liquids and water is less than the weight amount of solvent.

When used with respect to the disclosed coating compositions, the word "homogeneous" refers to a composition that does not exhibit a visibly separate precipitate or visibly separate layer (although it may exhibit shading variation or other indicia of slight gradation in concentration) if freshly shaken, placed in a glass vessel having at least a 40 mm inside diameter (e.g. a 125 ml cylindrical glass jar, 125 ml square glass jar, or 100 ml borosilicate glass beaker) and allowed to stand at room temperature for at least 4 hours. The term "quasi-homogenous" refers to a composition that does not exhibit a visibly separate precipitate or visibly separate layer within 30 minutes after being freshly shaken and placed in such a glass vessel, but which does exhibit a visibly separate precipitate or visibly separate layer if allowed to stand at room temperature for at least 4 hours.

When used with respect to the disclosed coating compositions, the term "non-hazy" refers to a coating composition that does not appear foggy or visibly scatter a ruby laser pointer beam. When used with respect to the disclosed cured coatings, the term "non-hazy" refers to a coating that exhibits less than 5% haze when measured using a HAZE-GA RD PLUS™ instrument from Byk-Gardner USA.

When used with respect to the disclosed coating compositions, the term "storage-stable" refers to a composition that remains homogeneous when stored for at least one week at room temperature in a sealed container.

When used in connection with a thin layer atop an underlayer on the disclosed coated articles, the word "continuous" means that the thin layer is at least 30 Å thick and covers the underlayer. The phrase "nearly continuous" means that the thin layer is at least 30 Å thick and covers the majority of the underlayer.

When used with respect to a coating formed from the disclosed coating compositions, the word "transparent" refers to a coating having a transmission in the visible portion of the spectrum, $T_{vis}$, of at least about 20%, measured along the normal axis. The phrase "pigments and opacifiers" refers to materials whose presence in sufficient amounts in such a coating composition could cause the $T_{vis}$ value to fall below 20%.

Highly crystalline fluoropolymers such as "PTFE" (homopolymer of tetrafluoroethylene ("TFE")), "PFA" (copolymer of TFE and perfluoro(propoxy vinyl ether)), and "FEP" (copolymer of TFE and hexafluoropropylene ("HFP")) have very desirable physical properties. The C—F bond's 116 Kcal/mol bond strength helps impart high thermal stability and excellent chemical resistance. Fluorine has the largest electronegativity of any element in the periodic table and the C—F bond has low polarizability. Highly crystalline fluoropolymers tend to have low solubility parameters, high molecular weight, and hydrophobic and oleophobic behavior. Unfortunately some of these same properties make it very difficult to dissolve highly crystalline fluoropolymers in organic solvents (except in some instances in some perfluorinated solvents, at low solids levels) and thus such highly crystalline fluoropolymers are not generally amenable to solvent coating applications.

Some fluorinated materials that are less crystalline than the above-mentioned highly crystalline fluoropolymers, or are amorphous, may be dissolved in some solvents. For example, less crystalline materials such as THV™ fluorothermopolymers (e.g., terpolymers of TFE, HFP and vinylidene fluoride ("VDF")), available from Dyneon, LLC, Oakdale, Minn.) and KYNAR™ polyvinylidene fluorides (e.g., TFE/VDF copolymers or TFE/HFP copolymers, available from Dyneon, LLC) and amorphous fluororesins such as FLUOREL™ fluoroelastomers (e.g., HFP/VDF copolymers and TFE/HFP/VDF terpolymers, available from 3M Company) may be dissolved in various ketones, ethers or acetates. However, these fluorinated materials tend to have less desirable mechanical properties than the above-mentioned highly crystalline fluoropolymers, and thus are not entirely suitable for coatings involving demanding end uses.

We have found that by blending a latex containing crystalline submicron fluoropolymer particles with a latex containing fluororesin particles, coagulating and drying the blended latex, and dissolving the dried blend in a solvent for the fluororesin particles, we can form coating compositions containing a homogeneous dispersion of the fluoropolymer particles in a solution of the fluororesin, at desirably high fluoropolymer particle solids levels, and using a variety of organic solvents. The coating compositions appear to have excellent storage stability without apparent settling or agglomeration. The applied coatings appear to have excellent physical properties. The fluoropolymer particles appear to be discernible and largely unagglomerated in the applied coating. In some embodiments the coating compositions can provide transparent or translucent applied coatings having sufficiently good properties to permit their use in optical applications and other end uses requiring high coating quality.

We have also found that by blending dry crystalline submicron fluoropolymer particles with dry fluororesin particles and dissolving the resulting mixture in a solvent for the fluororesin particles, or by blending dry crystalline submicron fluoropolymer particles with a solvent-borne solution of a fluororesin, we can form coating compositions containing a dispersion of the fluoropolymer particles in a solvent-borne solution of the fluororesin. These latter coating compositions have less storage stability than the homogeneous coating compositions mentioned above, but if agitated just prior to use may be employed to form applied coatings (e.g., optical coatings) that appear to have very good physical properties.

A variety of crystalline fluoropolymer particles may be employed in the disclosed coating compositions. Exemplary crystalline fluoropolymer particles include particles of fluoropolymers having a combination of high crystalline content (as indicated by a $T_m$ greater than about 150° C.) and fluorine content greater than about 50 weight percent. For example, the fluoropolymer particles may include particles of fluoropolymers having a $T_m$ between about 150° C. and about 375° C., between about 150° C. and about 320° C., between about 150° C. and about 300° C. or between about 170° C. and about 300° C. Also, the fluoropolymer particles may include particles of fluoropolymers having a fluorine content between about 50 and about 76 weight percent, between about 60 and about 76 weight percent, or between about 65 and about 76 weight percent. Representative crystalline fluoropolymers include, for example, perfluorinated fluoropolymers such as crystalline PTFE dispersions (e.g., DYNEON™ TF 5032

PTFE, DYNEON TF 5033 PTFE, DYNEON TF 5035 PTFE or DYNEON TF 5050 PTFE from Dyneon, LLC, and TEFLON™ PTFE GRADE 30 and TEFLON PTFE GRADE 307A from E.I. du Pont de Nemours & Co.), ETFE copolymers (e.g., DYNEON Fluorothermoplastic ET 6235 and DYNEON Fluorothermoplastic ET X 6230 A from Dyneon, LLC, and TEFZEL™ ETFE fluoropolymer from E.I. du Pont de Nemours & Co.), PFA copolymers (e.g., DYNEON Fluorothermoplastic PFA 6900N and DYNEON Fluorothermoplastic PFA X 6910N, from Dyneon, LLC), and FEP copolymers (e.g., DYNEON Fluorothermoplastic FEP X 6300, from Dyneon, LLC). Representative crystalline fluoropolymers also include, for example, highly fluorinated fluoropolymers such as DYNEON THV 340D Fluorothermoplastic, DYNEON THV 510D Fluorothermoplastic, DYNEON THV 600 Fluorothermoplastic and DYNEON THV 800 Fluorothermoplastic water-based copolymer latices, all from Dyneon, LLC. Other suitable fluoropolymer particles are available from suppliers such as Asahi Glass, Ausimont, Hoechst and Daikin Industries and will be familiar to those skilled in the art. Mixtures of fluoropolymer particles may be employed. The fluoropolymer particles desirably have a small average particle diameter, for example less than 400 nm, but may be larger if desired especially where the applied coating will be rubbed after cure. For example, the fluoropolymer particle size range may be about 50 to about 1000 nm, or about 50 to about 400 nm, or about 50 to about 200 nm.

A variety of fluororesins (which as noted above include fluoroplastics) may be employed in the disclosed coating compositions. Exemplary fluororesins include those having a combination of low crystalline content (as indicated by a $T_m$ less than about 150° C.) or an amorphous structure (as indicated by having no measurable crystalline melting point as determined using differential scanning calorimetry), together with a fluorine content greater than about 40 weight percent. For example, the fluororesins may include those having a $T_m$ less than about 100° C., less than about 80° C., less than about 60° C., or those that have no measurable crystalline melting point. Also, the fluororesins may include those having a fluorine content between about 40 and about 76 weight percent, between about 50 and about 76 weight percent, between about 60 and about 76 weight percent, between about 65 and about 76 weight percent, or between about 65 and about 71 weight percent. Representative such fluororesins include, for example THV fluorothermoplastics (e.g., DYNEON THV 220D Fluorothermoplastic water-based copolymer latex from Dyneon, LLC); KYNAR polyvinylidene fluorides (e.g., KYNAR 2800 HFP/VDF copolymer, KYNAR 7201 TFE/VDF copolymer and KYNAR 9301 VDF/HFP/TFE terpolymer from Dyneon, LLC, and KYNAR poly(vinylidene fluoride) ("PVDF") resins (e.g., KYNAR 500 copolymer dispersions from Atofina Chemical, Philadelphia, Pa.); FLUOREL fluoroelastomers (e.g., FLUOREL HFP/VDF copolymers and FLUOREL TFE/HFP/VDF terpolymers, commercially available from Dyneon, LLC); DYNEON fluoroelastomers (e.g., DYNEON FE-2145, DYNEON FT-2481, DYNEON FE-5530, DYNEON FE-5730 and DYNEON FE-5830 fluoroelastomers from Dyneon, LLC); NEOFLON™ poly(chlorotrifluoroethylene) elastomers from Daikin Industries; and amorphous fluoropolymer powders (e.g., CYTOP™ powders from Asahi Glass, TEFLON AF 1600 and TEFLON AF 2400 powders from E.I. du Pont de Nemours & Co. and DYNEON J24 powder from Dyneon LLC). Other suitable fluororesins are available from suppliers such as Ausimont, Hoechst and Daikin Industries and will be familiar to those skilled in the art. The fluororesin may be made from a monomer mixture including one or more cure site monomers (e.g., monomers having a halogen cure site such as a chlorine, iodine or bromine cure site). Halogen cure sites can be introduced into the fluororesin polymer microstructure via the judicious use of halogenated chain transfer agents which provide reactive halogen endgroups. Exemplary chain transfer agents will be familiar to those skilled in the art and may be found, for example, in U.S. Pat. No. 4,000,356. In addition to or in place of a halogen-containing cure site monomer, the fluororesin may be made from a monomer mixture including one or more other cure site monomers, e.g., nitrile-containing cure site monomers as described in U.S. Pat. No. 6,720,360. Mixtures of fluororesins may be employed.

The crystalline fluoropolymer particles and fluororesin may be combined in a variety of ratios. For example, considering only the weight of fluoropolymer particles and fluororesin, exclusive of any solvent or other added materials, the disclosed coating compositions may contain about 5 to about 95 weight percent fluoropolymer particles and about 95 to about 5 weight percent fluororesin; about 10 to about 75 weight percent fluoropolymer particles and about 90 to about 25 weight fluororesin; about 10 to about 50 weight percent fluoropolymer particles and about 90 to about 50 weight percent fluororesin; or about 10 to about 30 weight percent fluoropolymer particles and about 90 to about 70 weight percent fluororesin. Clear, non-hazy coatings having particular value in optical applications may for example contain about 5 to about 60 weight percent fluoropolymer particles and about 95 to about 40 weight percent fluororesin, or about 5 to about 60 weight percent fluoropolymer particles and about 95 to about 40 weight percent fluororesin, and preferably are sufficiently free of pigments or other opacifiers so as to form a coating solution capable of forming a transparent hardened coating.

The crystalline fluoropolymer particles and fluororesin desirably are combined by blending a latex containing crystalline submicron fluoropolymer particles with a latex containing fluororesin particles and coagulating, optionally washing, and drying the blended latex. Coagulation may be carried out, for example, by chilling (e.g., freezing) the blended latices or by adding a suitable salt (e.g., magnesium chloride). Chilling is especially desirable for coatings that will be used in semiconductor manufacturing and other applications where the introduction of salts may be undesirable. The washing step may substantially remove emulsifiers or other surfactants from the mixture and can assist in obtaining a well-mixed blend of substantially unagglomerated dry particles. The surfactant level in the resulting dry particle mixture may, for example, be less than 0.1% by weight, less than 0.05% by weight or less than 0.01% by weight. The particle mixture may next be dissolved in a solvent for the fluororesin particles to form a storage-stable coating composition containing a homogeneous dispersion of the fluoropolymer particles in a solution of the fluororesin, which composition may be stored for an extended period of time (e.g., for more than one week, more than one month, more than six months of more than one year) without apparent settling or agglomeration before being used to form a desired coating.

The crystalline fluoropolymer particles and fluororesin also may be combined by blending dry crystalline submicron fluoropolymer particles with dry fluororesin particles and dissolving the resulting mixture in a solvent for the fluororesin particles, or by blending dry crystalline submicron fluoropolymer particles with a solvent-borne solution of a fluororesin. These steps can provide a quasi-stable coating composition containing a dispersion of the fluoropolymer particles in a solvent-borne solution of the fluororesin. The resulting compositions may be used promptly before observable settling or agglomeration takes place (e.g., within no more than a week or no more than a day) or if need be may be agitated sufficiently just prior to use to redisperse the fluoropolymer particles, and used to form a desired coating.

A variety of solvents may be employed in the disclosed coating compositions. Representative solvents include, for example, ketones such as acetone, MEK, methyl isobutyl ketone, methyl amyl ketone and NMP; ethers such as tetrahydrofuran, 2-methyl tetrahydrofuran and methyl tetrahydrofurfuryl ether; esters such as methyl acetate, ethyl acetate and butyl acetate; cyclic esters such as delta-valerolactone and gamma-valerolactone; fluorinated solvents such as perfluoro-2-butyltetrahydrofuran and hydrofluoroethers; and mixtures thereof. As noted above, the disclosed coating compositions may also contain other organic liquids that cannot dissolve the fluororesin, and may also contain water, provided that the weight amount of such other organic liquids and water is less than the weight amount of solvent. For example, such other organic liquids or water may represent less than 30%, less than 10%, less than 5% or less than 1% of the disclosed coating composition.

The disclosed coating compositions may contain a variety of optional additional ingredients. Exemplary additional ingredients include adhesion promoting agents (e.g., silanes), fluoropolymer crosslinking agents (e.g., polyolefins) and initiators (e.g., photoinitiators and thermal initiators). The types and amounts of such additional ingredients will be readily understood by those skilled in the art. For example, exemplary adhesion promoting agents include photograftable silane esters containing olefinic functionality such as 3-(trimethoxysilyl) propyl methacrylate and vinyltrimethoxy silane. These photograftable silane esters may react with the fluoropolymer, fluororesin backbone to form a silyl-grafted material having pendent siloxy groups. Such siloxy groups may be available to form a bond with other ingredients in the same or adjacent coating layers thereby providing improved adhesion to the other ingredient or adjacent layer. Other adhesion promoting agents include amino-substituted organosilanes such as 3-aminopropyltrimethoxysilane and its oligomers (e.g., SILQUEST™ A-1110 from GE Silicones, Wilton, Conn.); 3-aminopropyltriethoxysilane and its oligomers (e.g., SILQUEST A-1100 and SILQUEST A-1106, from GE Silicones); 3-(2-aminoethyl)aminopropyltrimethoxysilane (e.g., SILQUEST A-1120 from GE Silicones); SILQUEST A-1130 from GE Silicones; (aminoethylaminomethyl)phenethyltrimethoxysilane; (aminoethylaminomethyl)phenethyltriethoxysilane; N-(2-aminoethyl)-3-aminopropylmethyldimethoxysilane (e.g., SILQUEST A-2120 from GE Silicones), bis-(γ-triethoxysilylpropyl) amine (e.g., SILQUEST A-1170 from GE Silicones); N-(2-aminoethyl)-3-aminopropyltributoxysilane; 6-(aminohexylaminopropyl)trimethoxysilane; 4-aminobutyltrimethoxysilane; 4-aminobutyltriethoxysilane; p-(2-aminoethyl) phenyltrimethoxysilane; 3-aminopropyltris(methoxyethoxyethoxy)silane; 3-aminopropylmethyldiethoxysilane; oligomeric aminosilanes such as 3-(N-methylamino)propyltrimethoxysilane (e.g., DYNASYLAN™ 1146 from Sivento Silanes of Piscataway, N.J.); N-(2-aminoethyl)-3-aminopropylmethyldimethoxysilane; N-(2-aminoethyl)-3-aminopropylmethyldiethoxysilane; N-(2-aminoethyl)-3-aminopropyltrimethoxysilane; N-(2-aminoethyl)-3-aminopropyltriethoxysilane; 3-aminopropylmethyldiethoxysilane; 3-aminopropylmethyldimethoxysilane; 3-aminopropyldimethylmethoxysilane; 3-aminopropyldimethylethoxysilane; 4-aminophenyltrimethoxy silane; 3-phenylaminopropyltrimethoxy silane; 2,2-dimethoxy-1-aza-2-silacyclopentane-1-ethanamine; 2,2-diethoxy-1-aza-2-silacyclopentane-1-ethanamine; 2,2-diethoxy-1-aza-2-silacyclopentane; 2,2-dimethoxy-1-aza-2-silacyclopentane; tertiary amines such as N,N-dimethyl aniline and diazabicyclooctane; and bis-silyl ureas such as $((RO)_3Si(CH_2)NR)_2C=O$. Mixtures of adhesion promoting agents may be employed.

Exemplary crosslinking agents include, for example, poly(meth)acryl monomers including di(meth)acryl containing compounds such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated (10) bisphenol A diacrylate, ethoxylated (3) bisphenol A diacrylate, ethoxylated (30) bisphenol A diacrylate, ethoxylated (4) bisphenol A diacrylate, hydroxypivalaldehyde modified trimethylolpropane diacrylate, neopentyl glycol diacrylate, polyethylene glycol (200) diacrylate, polyethylene glycol (400) diacrylate, polyethylene glycol (600) diacrylate, propoxylated neopentyl glycol diacrylate, tetraethylene glycol diacrylate, tricyclodecanedimethanol diacrylate, triethylene glycol diacrylate and tripropylene glycol diacrylate. Other suitable crosslinking agents include tri(meth)acryl containing compounds such as glycerol triacrylate, trimethylolpropane triacrylate, ethoxylated triacrylates (e.g., ethoxylated (3) trimethylolpropane triacrylate, ethoxylated (6) trimethylolpropane triacrylate, ethoxylated (9) trimethylolpropane triacrylate, ethoxylated (20) trimethylolpropane triacrylate), pentaerythritol triacrylate, propoxylated triacrylates (e.g., propoxylated (3) glyceryl triacrylate, propoxylated (5.5) glyceryl triacrylate, propoxylated (3) trimethylolpropane triacrylate, propoxylated (6) trimethylolpropane triacrylate), trimethylolpropane triacrylate and tris(2-hydroxyethyl)isocyanurate triacrylate. Additional suitable crosslinking agents include higher functionality (meth)acryl containing compounds such as ditrimethylolpropane tetraacrylate, dipentaerythritol pentaacrylate, ethoxylated (4) pentaerythritol tetraacrylate and pentaerythritol tetraacrylate, caprolactone modified dipentaerythritol hexaacrylate; hydantoin moiety-containing poly(meth)acrylates, for example, as described in U.S. Pat. No. 4,262,072; and oligomeric (meth)acryl compounds such as, for example, urethane acrylates, polyester acrylates, epoxy acrylates; polyacrylamide analogues of the foregoing; and combinations thereof. Suitable crosslinking agents are widely available from vendors including Sartomer Company, Exton, Pa.; UCB Chemicals Corporation, Smyrna, Ga.; and Aldrich Chemical Company, Milwaukee, Wis. Exemplary commercially available crosslinking agents include SR-351 trimethylolpropane triacrylate ("TMPTA") and SR-444 and SR 494 pentaerythritol tri/tetraacrylate ("PETA"), all from Sartomer Company. Mixtures of crosslinking agents and monofunctional materials (for example, mixtures of multifunctional and monofunctional (meth)acrylates, such as a mixture of TMPTA and methyl methacrylate), may also be employed. Other crosslinking agents or monofunctional materials that may be utilized in the disclosed coating compositions include fluorinated (meth) acrylates such as perfluoropolyether (meth)acrylates. These perfluoropolyether acrylates may desirably be based on multi-(meth)acrylate or mono-(meth)acrylate derivatives of hexafluoropropylene oxide ("HFPO") and may (in the case of the multi-(meth)acrylate derivatives) be used as a sole crosslinking agent. The multi-(meth)acrylate derivatives may also be used with nonfluorinated monofunctional (meth)acrylates such as methyl methacrylate, or with nonfluorinated crosslinking agents such as TMPTA or PETA, and the mono-(meth)acrylate derivatives may be used with nonfluorinated crosslinking agents such as TMPTA or PETA.

Exemplary initiators include free-radical photoinitiators such as benzophenone and its derivatives; benzoin, alpha-methylbenzoin, alpha-phenylbenzoin, alpha-allylbenzoin, alpha-benzylbenzoin; benzoin ethers such as benzil dimethyl ketal (e.g., IRGACURE™ 651, from Ciba Specialty Chemicals Corporation of Tarrytown, N.Y.), benzoin methyl ether, benzoin ethyl ether, benzoin n-butyl ether; acetophenone and its derivatives such as 2-hydroxy-2-methyl-1-phenyl-1-propanone (e.g., DAROCUR™ 1173, from Ciba Specialty Chemicals Corporation) and 1-hydroxycyclohexyl phenyl ketone (e.g., IRGACURE 184, from Ciba Specialty Chemicals Corporation); 2-methyl-1-[4-(methylthio)phenyl]-2-(4-morpholinyl)-1-propanone (e.g., IRGACURE 907, from Ciba Specialty Chemicals Corporation); 2-benzyl-2-(dimethylamino)-1-[4-(4-morpholinyl)phenyl]-1-butanone (e.g., IRGACURE 369, from Ciba Specialty Chemicals Corporation); aromatic ketones such as benzophenone and its derivatives and anthraquinone and its derivatives; benzildimethylketals (e.g., ESACURE™ KB-1, from Lamberti S.p.A of Gallarate, Spain; onium salts such as diazonium salts, iodonium salts, sulfonium salts; titanium complexes (e.g., CGI 784 DC, from Ciba Specialty Chemicals Corporation); halomethylnitrobenzenes; and mono- and bis-acylphosphines (e.g., IRGACURE 1700, IRGACURE 1800, IRGACURE 1850, IRGACURE 819, IRGACURE 2005, IRGACURE 2010, IRGACURE 2020 and DAROCUR 4265, all from Ciba Specialty Chemicals Corporation. Mixtures of photoinitiators may also be employed. Photosensitizers may also be used. For example, the photosensitizer 2-isopropyl thioxanthone from First Chemical Corporation, Pascagoula, Miss. may be used in conjunction with photoinitiators such as IRGACURE 369. Exemplary thermal initiators include azo, peroxide, persulfate and redox initiators, and mixtures thereof. If desired, mixtures of photoinitiators and thermal initiators may be employed. Initiators typically are used in a total amount less than about 10 weight percent, more typically less than about 5 weight percent, based on the total coating composition weight.

Those skilled in the art will appreciate that the disclosed coating compositions can contain other optional adjuvants, including surfactants, antistatic agents (e.g., conductive polymers), leveling agents, ultraviolet ("UV") absorbers, stabilizers, antioxidants, lubricants, pigments or other opacifiers (except insofar as might frustrate the attainment of adequate transparency in an optical coating), dyes, plasticizers, suspending agents and the like. For applications where optical performance is important, the cured coating preferably has a visible light transmission of at least about 70% at 550 nm, more preferably at least about 80% and most preferably at least about 90%, and may preferably be substantially pigment- and opacifier-free.

The disclosed coatings may be applied and cured using a variety of techniques that will be familiar to those skilled in the art. Exemplary coating methods include die coating, knife coating, spray coating, curtain coating and dip coating. The coating composition may be applied in a continuous manner, e.g., by coating a moving web or other support or substrate to provide a roll, or long coated length, of coated article. The coating composition may instead or in addition be applied to individual or multiple separate support portions to provide, for example, one or more singly or multiply coated articles. Exemplary curing techniques include the use of energy sources such as ultraviolet light, visible light, electron beam, infrared and other sources that will be familiar to those skilled in the art.

A variety of supports can be employed in the disclosed articles. Representative supports include rigid substrates such as glass, metals, ceramics, semiconductors, various thermoplastic or crosslinked polymeric materials, and other substrates that will be familiar to those skilled in the art. Representative supports also include flexible substrates (e.g., transparent, translucent, or opaque flexible films, woven or nonwoven webs, and flexible laminates), such as cellulosic materials (e.g., cellulose triacetate or "TAC"); plastics including polyesters and copolyesters such as polyethylene terephthalate ("PET"), heat stabilized PET ("HSPET"), terephthalate copolyester ("coPET"), polyethylene naphthalate ("PEN"), naphthalate copolyesters ("coPEN") and polybutylene 2,6-naphthalate ("PBN"); polyolefins such as low-density polyethylene ("LDPE"), linear low-density polyethylene ("LLDPE"), high density polyethylene ("HDPE"), polypropylene ("PP") and cyclic olefin copolymers (e.g., metallocene-catalyzed cyclic olefin copolymers or "COCs"); acrylates and methacrylates such as polymethyl methacrylate ("PMMA"), ethylene ethyl acrylate ("EEA"), ethylene methyl acrylate ("EMA") and ethylene vinyl acrylate ("EVA"); styrenics such as polystyrene ("PS"), acrylonitrile-butadiene-styrene ("ABS"), styrene-acrylonitrile ("SAN"), styrene/maleic anhydride ("SMA") and poly α-methyl styrene; polyamides such as nylon 6 ("PA6"); polyamideimide ("PAI"); polyimide ("PI"); polyetherimide ("PEI"); polyphthalamide; polyvinyl chloride ("PVC"); polyoxymethylene ("POM"); polyvinylnaphthalene ("PVN"); polyetheretherketone ("PEEK"); polyaryletherketone ("PAEK"); phenolics; epoxies; fluoropolymers (e.g., DYNEON™ HTE terpolymer of hexafluoropropylene, tetrafluoroethylene, and ethylene); polycarbonates such as polycarbonate of bisphenol A ("PC"); polyarylate ("PA R"); polyphenylene oxide ("PPO"); sulfones such as polysulfone ("PSul"), polyarylsulfone ("PAS") and poly ether sulfone ("PES"); and other materials that will be familiar to those skilled in the art.

The support typically will be chosen based in part on the desired mechanical, chemical (and if need be optical) properties for the intended use. Desired mechanical and chemical properties typically will include one or more of flexibility, dimensional stability, impact resistance, coating receptivity or adhesion, surface contamination and surface topography. Desired optical properties typically will include transparency, gloss, haze, and the presence or absence of a matte finish. For example, both glossy and matte finish light transmissive supports may be employed in display panels. Matte supports typically have lower transmission and higher haze values than typical glossy supports. Matte finish flexible films may for example include micrometer-sized dispersed inorganic fillers such as silica that diffuse light. Exemplary matte films are commercially available from U.S.A. Kimoto Tech, Cedartown, Ga. under the trade designation "N4D2A". A variety of other supports including multilayer optical films, microstructured films such as retroreflective sheeting and brightness enhancing films, polarizing or retarder films (e.g. reflective or absorbing polarizing films, and biaxial retarder films), diffusive films and compensator films (e.g., as described in U.S. Patent Application Publication No. 2004/0184150 A1) may also be employed. Multilayer optical films have particular utility and are described for example in U.S. Pat. Nos. 5,882,774 and 6,368,699, U.S. Patent Application Publication No. 2003/0217806 A1 and International Application Nos. WO 95/17303 and WO 99/39224.

The support thickness typically also will depend on the intended use. For applications involving flexible film supports that are made or coated using roll-to-roll processing equipment, the support preferably has a thickness of about 0.005 to about 1 mm, more preferably about 0.02 to about 0.25 mm. Flexible films may be formed using conventional filmmaking techniques such as by extrusion and optional uniaxial orientation, biaxial orientation, heat setting, annealing under tension and other techniques that will be familiar to those skilled in the art. For example, the support may be formed so as to discourage shrinkage up to at least a heat stabilization temperature when the support is not constrained. The support can be treated to improve adhesion to the support, e.g., using chemical treatment, corona treatment such as air or nitrogen corona, plasma, flame, or actinic radiation. If desired, an optional tie layer or primer can instead or in addition be applied to the support to increase adhesion.

We have found that articles coated with hardened (e.g., dried) or cured (e.g., polymerized or crosslinked) coatings formed from the disclosed coating compositions may be rubbed, buffed, polished or otherwise disturbed to cause submicron fluoropolymer particles at the coating surface to form a thin, continuous or nearly continuous fluoropolymer surface layer atop the remainder of the underlying coating. In preferred embodiments the thin fluoropolymer layer is relatively uniformly smeared over the underlying coating and appears to be thinner and more uniform than might be the case if the fluoropolymer particles had merely undergone fibrillation (e.g., due to orientation or other stretching). Rubbing may also reduce haze in the cured coating. The disclosed coating compositions may thus be used to provide an article coated with a hardened or cured coating comprising a thin, continuous or nearly continuous fluoropolymer layer atop a fluororesin binder containing crystalline submicron fluoropolymer particles. A variety of rubbing techniques can be employed at the time of coating formation or later when the coated article is used or about to be used. Simply wiping or buffing the coating a few times using a cheesecloth or other suitable woven, nonwoven or knit fabric will often suffice to form the desired thin layer. Those skilled in the art will appreciate that many other rubbing techniques may be employed.

The disclosed coatings may be used in a variety of applications that will be familiar to those skilled in the art. For example, the disclosed coatings may be applied to articles on which a low friction surface, a hydrophobic surface, an oleophobic surface or a light management structure may be desired. One exemplary use involves applying the disclosed coating as the low refractive index coating layer of an antireflection film for an optical display or display panel. Such displays and display panels may be illuminated or non-illuminated portable or non-portable information display devices, e.g., where a combination of low surface energy (e.g., anti-soiling, stain resistance, oil repellency or water repellency), durability (e.g., abrasion resistance) and optical clarity (e.g., low haze) may be desired. For example, the haze level desirably may be less than 5%, less than 2%, less than 1% or less than 0.5% when measured using the above-mentioned HAZE-GARD PLUS instrument. The antireflection film may decrease glare and transmission loss while improving durability and optical clarity. The disclosed coating compositions are especially useful for covering at least part of an information display viewing surface that is susceptible to damage or that is susceptible to being touched or contacted by ink pens, markers and other marking devices, wiping cloths, paper items and the like. The viewing surface may for example include an underlying transparent support, a hardcoat, a suitably thin high refractive index layer, and a suitably thin low refractive index layer made from the disclosed coating composition. Exemplary information displays include multi-character and especially multi-line multi-character displays such as liquid crystal displays ("LCDs"), plasma displays, front and rear projection displays, cathode ray tubes ("CRTs") and signage, as well as single-character or binary displays such as light emitting diodes ("LEDs"), signal lamps and switches. Exemplary electronic or electrical devices that may use such information displays include personal digital assistants ("PDAs"), LCD televisions (direct lit and edge lit), cell phones (including combination PDA/cell phones), touch sensitive screens, wrist watches, car navigation systems, global positioning systems, depth finders, calculators, electronic books, CD and DVD players, projection television screens, computer monitors, notebook computer displays, instrument gauges, instrument panel covers, signage such as graphic displays and the like. These devices typically have an exposed viewing surface that may be referred to as a "lens". The viewing surface may be planar or non-planar (e.g., slightly curved) and may have any desired size and shape. The disclosed coating compositions may also be employed as indoor or outdoor architectural coatings, protective coatings or decorative coatings on a variety of other transparent or nontransparent articles including lenses (e.g., camera lenses, eyeglass lenses and binocular lenses); mirrors and other reflectors including decorative sheeting and retroreflective sheeting; vehicular headlamps and taillights; windows (including windshields and backlights) on vehicles including automobiles, boats, trains and aircraft; vehicular bodies and trim; architectural windows for interior or exterior use; building surfaces; equipment enclosures; display cases; road pavement markers (e.g. raised markers), road signs and pavement marking tapes; overhead projectors; entertainment cabinet doors and entertainment device covers; watch covers; optical and magneto-optical recording disks; and other articles that will be familiar to those skilled in the art.

The invention is further illustrated in the following illustrative examples, in which all parts and percentages are by weight unless otherwise indicated. Unless otherwise noted, all chemical reagents were or can be obtained from Aldrich Chemical Co., Milwaukee, Wis. The following abbreviations are employed:

| | |
|---|---|
| "A174" | refers to 3-(trimethoxysilyl)propyl methacrylate. |
| "A1106" | refers to SILQUEST A-1106 silane, 3-aminopropyltriethoxysilane from GE Silicones, Wilton CT. |
| "APTMS" | refers to 4-aminophenyltrimethoxysilane. |
| "BPB" | refers to t-butyl peroxide benzoate. |
| "DIADC" | refers to diisopropyl azodicarboxylate. |
| "DMAPS" | refers to N,N-dimethylaminopropyltrimethoxysilane. |
| "FKM LATEX A" | refers to DYNEON E15742 water-based latex of a VDF/TFE/HFP/BTFE fluoroelastomer (where "HFP" is hexafluoropropylene and "BTFB" is bromotetrafluorobutene) having a 32% solids concentration and a peroxide-curable bromine cure site from Dyneon LLC. |
| "FKM LATEX B" | refers to DYNEON E18042 water-based latex of a VDF/TFE/HFP/ITFB fluoroelastomer (where "ITFB" is iodotetrafluorobutene) having a 12.7% solids concentration and a peroxide-curable iodine cure site from Dyneon LLC. |
| "FKM-A" | refers to the dry solid FKM polymer prepared by coagulation of FKM LATEX A. |
| "FKM-B" | refers to the dry solid FKM polymer prepared by coagulation of FKM LATEX B. |

-continued

| Term | Definition |
|---|---|
| "HFPO-A" | refers to a hexafluoropropylene oxide amido-ethoxyacrylate having the formula $C_3F_7O(CFCF_3CF_2O)_5CF(CF3)CONHCH_2CH_2OCOCH=CH_2$ prepared as described in Assignee's copending U.S. patent application Ser. No. 11/009,181 filed Dec. 10, 2004, the disclosure of which is incorporated by reference. |
| "HFPO-B" | refers to a mixture of 20% TMPTA, 40% 1:1 HFPO/TMPTA adduct and 40% 2:1 HFPO/TMPTA adduct, where the 1:1 and 2:1 HFPO/TMPTA adducts are prepared by mixing the hexafluoropropylene oxide-amidopropylmethylamine adduct $HFPOC(O)N(H)CH_2CH_2CH_2N(H)CH_3$ with TMPTA in a 1:1 or 2:1 molar ratio, as described in Assignee's above-mentioned U.S. patent application Ser. No. 11/009,181. |
| "I651" | refers to IRGACURE ™ 651 2-phenyl-2,2-dimethoxy acetophenone from Ciba Specialty Chemicals, Tarrytown, NY. |
| "PAP-TMS" | refers to N-phenyl-3-aminopropyltrimethoxysilane. |
| "PET" | refers to MELINEX ™ 618 0.13 mm thick primed poly(ethylene terephthalate) film from E.I. du Pont de Nemours and Co., Wilmington, DE. |
| "PET-H" | refers to MELINEX 618 PET film coated with a ceramer hardcoat composition like that described in Example 3 of U.S. Pat. No. 6,299,799. A 30% solution of the ceramer composition in isopropanol was coated at a 5 micrometer thickness onto the primed PET surface and cured under a 600 watt H-type bulb from Fusion UV systems, Gaithersburg Maryland in a chamber containing less than 50 ppm oxygen. |
| "PFA LATEX A" | refers to DYNEON Fluorothermoplastic PFA 6910N, available as a 20.4% solids water-based latex from Dyneon LLC. |
| "PFA LATEX B" | refers to DYNEON Fluorothermoplastic PFA 6900N fluorothermoplastic, available as a 30% solids water-based latex from Dyneon LLC. |
| "PFA-A" | refers to the dry solid PFA polymer prepared by coagulation of PFA LATEX A. |
| "PFA-B" | refers to the dry solid PFA polymer prepared by coagulation of PFA LATEX B. |
| "PTFE LATEX A" | refers to DYNEON PTFE LATEX 5033, available as a 9.6% solids TFE homopolymer latex from Dyneon LLC. |
| "PTFE-A" | refers to the dry solid TFE homopolymer prepared by coagulation of PTFE LATEX A. |
| "PTFE-J" | refers to DYNEON J24 poly(tetrafluoroethylene) micropowder from Dyneon LLC. |
| "PVDF-A" | refers to KYNAR ™ 7201 poly(vinylidene fluoride) fluororesin from Dyneon LLC. |
| "TAIC" | refers to triallylisocyanurate. |
| "THV LATEX A" | refers to DYNEON THV 220D water-based fluororesin latex, a 24% solids VDF/HFP/TFE copolymer from Dyneon LLC. |
| "THV LATEX B" | refers to DYNEON THV 230 water-based fluororesin latex, a 36% solids VDF/HFP/TFE copolymer from Dyneon LLC. |
| "THV A" | refers to the dry solid THV polymer prepared by coagulation of THV LATEX A. |
| "THV B" | refers to the dry solid THV polymer prepared by coagulation of THV LATEX B. |
| "TMPTA" | refers to trimethylolpropane triacrylate. |
| "VS" | refers to vinyl trimethoxysilane. |

Peel strength was evaluated using the test procedures described in ASTM D-1876 entitled "Standard Test Method for Peel Resistance of Adhesives", more commonly known as a "T-peel" test. The samples were prepared by thermally laminating the coated side to a 0.5 mm thick sheet of suitably adherent fluoropolymer (e.g., a sheet of THV 200 fluororesin from Dyneon, LLC for fluoroelastomer-based coatings, and a sheet of PVDF fluoroelastomer from Dyneon, LLC for PVDF-based coatings). To facilitate later separation, a strip of non-adherent PTFE-coated fiber sheet was temporarily inserted between the assembled layers, at a 6 mm depth along one edge of the assembled layers. The assembled layers were pressed together for 2 minutes between the heated platens of a Wabash Hydraulic press at a temperature (e.g., about 200° C.) sufficient to fuse the sample and 0.5 mm thick sheet together, then cooled to room temperature between the platens of a cold press. The resulting laminated assembly was subjected to a T-peel measurement. Data was obtained using an INSTRON™ Model 1125 tester (available from Instron Corp., Canton, Mass.) equipped with a SINTECH™ Model 20 measuring system (available from MTS Systems Corporation, Eden Prairie, Minn.) and operated at a 101.6 mm/min cross-head speed. The peel strength was calculated as the average load measured during the peel test, and reported in Kg/mm width for an average of at least two samples. In some instances peel adhesion was qualitatively evaluated by immersing the laminated samples in boiling water for two hours and then manually separating the lamination to determine the extent of interlayer failure. The qualitative adhesion level was indicated as follows: "Delaminated" means that the coating detached from the support in the boiling water, "Moderate" means that the coating could be easily detached from the support, "Good" means that the coating could be detached from the support with difficulty, and "Strong" means that the coating could not be detached from the support.

Abrasion resistance was manually evaluated by allowing the coated, cured samples to stand overnight in air. Each sample was then rubbed 10 times with a KIMWIPE paper towel (available from Kimberly-Clark Corp., Neenah, Wis.) using forceful hand pressure. The abrasion marks, if any were visually evaluated and a score of "None", "Very Slight", "Slight" or "Scratched" was assigned to indicate the extent of observed manual abrasion. The result was reported as the Extent of Scratching (Manual Abrasion Resistance).

Abrasion resistance was also evaluated using a sand abrasion test to evaluate the percent change in reflectivity ("$\Delta R$") when the coating is abraded with sand. A suitably thin layer of the disclosed coatings (e.g., an odd multiple of the quarter-wavelength of incident light) may have antireflective properties. Coating losses due to abrasion can thus be measured by evaluating $\Delta R$, with lower $\Delta R$ values corresponding to improved sand abrasion resistance. Each coated film test sample was die cut to a 90 mm diameter. The middle of the film sample was marked on its uncoated side with a 25 mm diameter circle to identify an optical zone where before and after reflection measurements will be made. Reflectivity values in the optical zone were measured at 550 nm using a LAMDA™ 900 UV-Vis-NIR spectrometer from Perkin-Elmer, Inc. of Wellesley, Mass., operated in the reflection mode. The film sample was placed in the lid for a Model WS-216922 straight-sided, clear glass 0.5 liter jar from Wheaton Glass Bottles, Millville, N.J., with the coating side facing the jar interior. The jar was partially filled with 80 g of 20-30 mesh Ottawa Sand Standard conforming to ASTM Standard C-190 T-132, obtained from VWR International of W. Chester, Pa. The lid was screwed into place and the jar mounted upside-down in a SIGNATURE™ Model DS-500E orbital shaker from VWR International. The shaker was operated at 250 rpm for 30 minutes, subjecting the sample to extensive sand abrasion. After this test time, the film sample was removed from the lid and the coating wiped with a soft cloth dampened with 2-propanol. Reflectivity was measured at 550 nm in the same optical zone as before and compared to the initial support reflectivity and initial coating reflectivity according to the following formula:

$$\text{Abrasion Resistance } (\Delta R) = (ACR - ICR)/(ISR - ICR)$$

where:
ACR refers to the abraded coating reflectivity
ICR refers to the initial coating reflectivity and
ISR refers to the initial support reflectivity and reported as a percentage change in reflectivity, $\Delta R$.

Abrasion resistance was also mechanically evaluated using a Model 4138 Linear Scratch Apparatus from Anorad Products, Hauppauge, N.Y. which moves a weighted diamond-graphite stylus once across the sample surface. Two different styli having diameters of 500 μm or 5 mm from Graff Diamond Products Limited, Brampton, Ontario, Canada were employed, at preloads between 250 and 1000 g. The stylus is moved across the coating at 6.7 m/min for 10.2 cm. The resulting scratch (if any) was evaluated using an AXIOTRON™ optical microscope equipped with an AXIO-IMAGER™ camera, both from Carl Zeiss AG of Goetting, Germany, and a video interface from Optronics-Terra Universal of Anaheim, Calif. The optical power was set at 10× and the nature of the damage was noted using a zero to 10 scale in which a zero ranking represented no visually apparent scratch and a ten ranking represented a scratch that completely penetrated the coating. The result was reported as the Mechanical Scratch Resistance.

EXAMPLE 1

A 352.9 g portion of PFA LATEX A was blended with a 900 g portion of FKM LATEX A to provide blended latices containing submicron fluoropolymer particles and fluororesin particles in a 20:80 weight ratio. The particles were coagulated by mixing the blended latices with 2.5 liters of a solution prepared by adding 60 g $MgCl_2.6H_2O$ to 2500 ml deionized water. The resulting mixture was filtered to isolate the solid particles, followed by washing the filtered particles three times with quantities of 70° C. deionized water equivalent to the water in the blended latices and drying the washed particles at 130° C. for 16 hours. Similar drying could be obtained using a 70° C. temperature overnight or a 90° C. temperature for 4 to 5 hours. The resulting mixture of dry fluoropolymer particles and dry fluororesin particles formed a white, gummy solid. Quantitative analysis of surfactant levels in the blended latices and dry particles showed that the surfactant level decreased from 1000 ppm (0.1%) in the blended latices to 168 ppm (0.0168%) in the dry particles.

The dry particle mixture was combined with sufficient MEK to provide a 20 wt. % solids coating solution. This provided a storage-stable masterbatch that was stored for over two months without the appearance of a visibly separate precipitate or visibly separate layer. The observed storage stability was much better than would normally be observed when combining fluoropolymer particles and MEK, and persisted despite the reduced surfactant level.

Figure 1B:
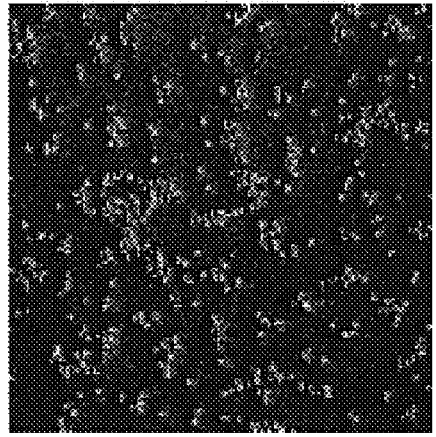
FIG 1c (height image) and FIG. 1d (phase image) are atomic microscopy photomicrographs for the Example 1 coating after rubbing.
Figure 1C:
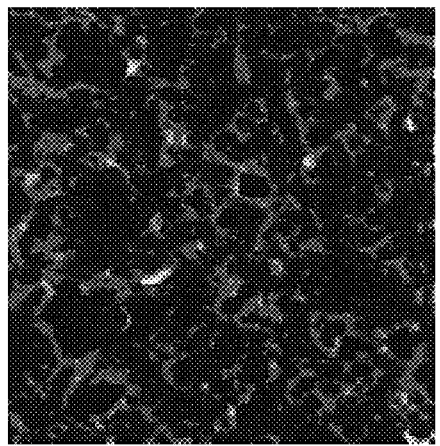
Figure 1D:
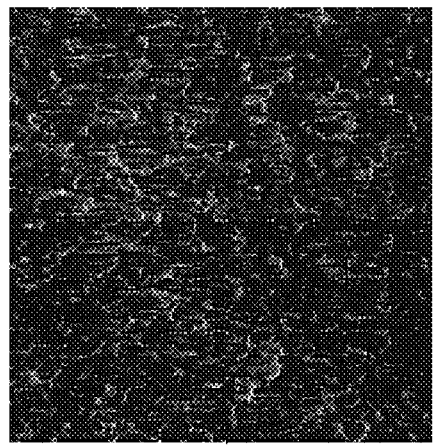

The masterbatch solids could be identified as "PFA-A/FKM-A 20/80" to indicate that 100 parts of the masterbatch solids would contain 20 parts PFA-A fluoropolymer particles and 80 parts FKM-A fluororesin particles. A portion of the masterbatch was diluted to 3% solids using MEK, applied to a PET support using a No. 3 Meyer Bar wire wound rod and dried at 120° C. for 10 minutes to provide a coating having a 100-120 nm dry thickness. The coating was subjected to UV radiation using three passes at 10.7 m/min through a chamber equipped with a 600 watt H-type bulb from Fusion UV Systems, Gaithersburg, Md. and containing less than 50 ppm oxygen. The hardened coating was transparent and colorless with very slight haze. When examined using atomic force microscopy, the fluoropolymer particles appeared to be unagglomerated and distributed across the coating surface. FIG. 1a is an atomic force microscopy photomicrograph showing the height image (left side) and phase image (right side) for the coating prior to rubbing. When the coating was rubbed with a KIMWIPES™ paper towel (commercially available from Kimberly-Clark Corp.), the haze disappeared. When reexamined using atomic force microscopy (see FIG. 1b), the fluoropolymer appeared to have spread in a thin film atop the entire coating surface. Spectroscopic surface examination using ESCA showed that the characteristic $CH_2$ peak from VDF units in the FKM fluoroelastomer was much more prominent before rubbing than after rubbing, indicating that the surface had become covered with a continuous or nearly continuous fluoropolymer layer. ESCA typically provides an analysis for the outermost 30 to 100 Å on the specimen surface.

The coating was also applied to the ceramer hardcoat side of a PET-H support. The hardened coating had a similar appearance and behavior before and after rubbing as was observed on a PET support.

EXAMPLE 2

Figure 2A:
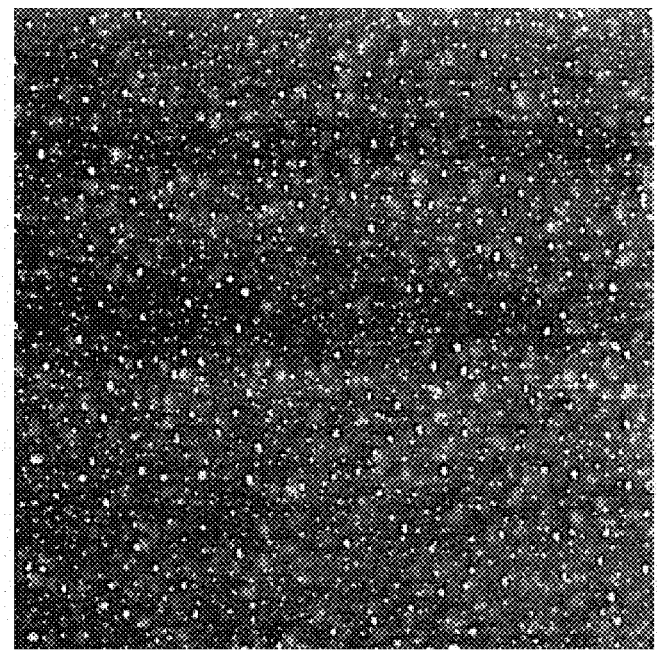
FIG. 2a and FIG. 2b are atomic force microscopy photomicrographs showing the phase image for the Example 2 coating before (FIG. 2a) and after (FIG. 2b) rubbing.
Figure 2B:

Using the method of Example 1, PTFE LATEX A was blended with FKM LATEX A to provide blended latices containing submicron fluoropolymer particles and fluororesin particles in a 20:80 weight ratio. The particles were coagulated by storing the blended latices in a freezer overnight at −20° C., allowing the frozen mixture to melt at room temperature, filtering to isolate the solid particles, washing the particles three times with quantities of 70° C. deionized water equivalent to the water in the blended latices, and drying the washed particles at 90° C. for 16 hours. The resulting mixture of dry fluoropolymer particles and dry fluororesin particles formed a white, gummy solid. The dry mixture was combined with sufficient MEK to provide a 20 wt. % solids coating solution. This provided a storage-stable masterbatch that was stored for over ten days without the appearance of a visibly separate precipitate or visibly separate layer before being consumed. The masterbatch solids could be identified as "PTFE-A/FKM-A 20/80" to indicate that 100 parts of the masterbatch solids would contain 20 parts PTFE-A fluoropolymer particles and 80 parts FKM-A fluororesin particles. A portion of the masterbatch was diluted sufficiently with MEK to form a 100 nm thick cured coating, and applied to and cured on PET and the ceramer hardcoat side of a PET-H support using the method of Example 1. The hardened coated articles were transparent and colorless with very slight haze. When examined using atomic force microscopy (see FIG. 2a), the fluoropolymer particles appeared to be unagglomerated and distributed across the coating surface. When the coating was rubbed with a paper towel the haze disappeared. When reexamined using atomic force microscopy (see FIG. 2b), the fluoropolymer appeared to have spread in a thin film atop the entire coating surface.

EXAMPLE 3

PFA LATEX A was blended with THV LATEX A to provide blended latices containing submicron fluoropolymer particles and fluororesin particles in a 20:80 weight ratio and converted to a dry powder blend by freezing, filtration, washing and drying. The resulting mixture of dry fluoropolymer particles and dry fluororesin particles had a fluffy, snow-white appearance. The dry mixture was combined with sufficient MEK to provide a 20 wt. % solids coating solution. This provided a storage-stable masterbatch that was stored for over one week without the appearance of a visibly separate precipitate or visibly separate layer before being consumed. The masterbatch solids could be identified as "PFA-A/THV-A 20/80" to indicate that 100 parts of the masterbatch solids would contain 20 parts PFA-A fluoropolymer particles and 80 parts THV-A fluororesin particles. A portion of the masterbatch was diluted sufficiently with MEK to enable a 100 nm thick cured coating to be applied using a No. 3 Meyer Bar wire wound rod, then applied to and photocured on PET and PET-H supports using the method of Example 1. The coating was also applied to PET and PET-H supports, air dried and heated to 90-120° C. to thermally adhere the coating. The hardened coated articles were transparent and colorless with very slight haze. When the coatings were rubbed with a paper towel the haze disappeared. When examined using atomic force microscopy, the fluoropolymer appeared to have spread in a thin film atop the entire coating surface.

EXAMPLE 4

Using the method of Example 3, PTFE LATEX A was blended with THV LATEX A to provide blended latices containing submicron fluoropolymer particles and fluororesin particles in a 20:80 weight ratio and converted to a dry powder blend by freezing, filtration, washing and drying. The resulting mixture of dry fluoropolymer particles and dry fluororesin particles had a fluffy, snow-white appearance. The masterbatch solids could be identified as "PTFE-A/THV-A 20/80" to indicate that 100 parts of the masterbatch solids would contain 20 parts PTFE-A fluoropolymer particles and 80 parts THV-A fluororesin particles. The dry mixture was combined with sufficient MEK to provide a 20 wt. % solids coating solution. This provided a storage-stable masterbatch that was stored for over twenty three months without the appearance of a visibly separate precipitate or visibly separate layer. Two weeks after it was prepared, a portion of the masterbatch was diluted sufficiently with MEK to enable a 100 nm thick cured coating to be applied using a No. 3 Meyer Bar wire wound rod, then applied to and photocured or heated on PET and PET-H supports using the method of Example 1. The hardened coated articles were transparent and colorless with no haze. When examined using atomic force microscopy, the fluoropolymer particles appeared to be unagglomerated and distributed across the coating surface.

EXAMPLE 5

A 20 g portion of PTFE-J dry fluoropolymer particles was combined with a solution made by dissolving 80 g PVDF-A fluororesin in 400 g MEK to provide a masterbatch containing submicron fluoropolymer particles and fluororesin in a 20:80 weight ratio, at an overall 20% solids level. The masterbatch solids could be identified as "PTFE-J/PVDF-A 20/80" to indicate that 100 parts of the masterbatch solids would contain 20 parts PTFE-J fluoropolymer particles and 80 parts PVDF-A fluororesin. A portion of the resulting composition was diluted to 3% solids using MEK, thoroughly mixed and promptly applied to and cured on PET and PET-H supports using the method of Example 1. The unrubbed and rubbed hardened coated articles were transparent and colorless with very slight haze.

Figure 3A:
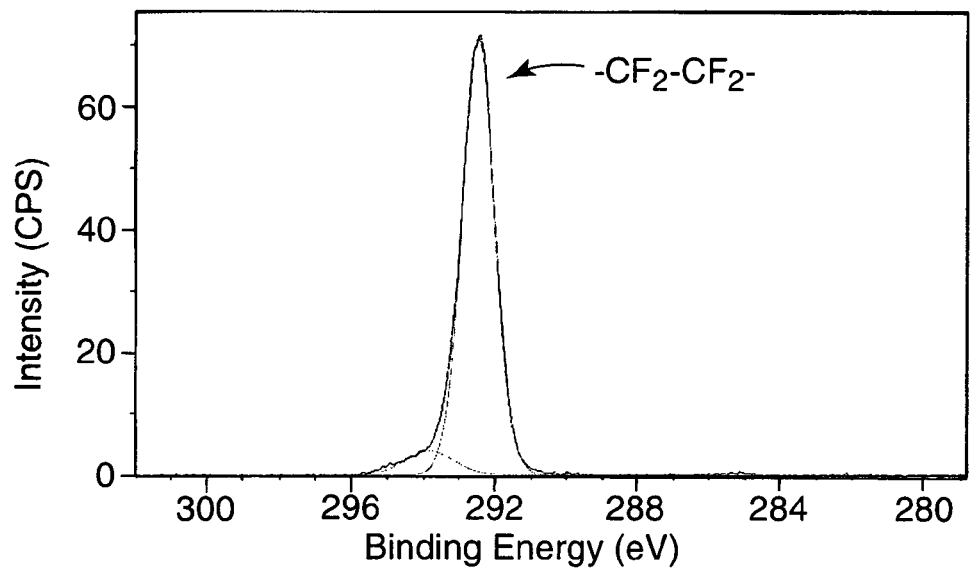
FIG. 3a, FIG. 3b, FIG. 3c and FIG. 3d are electron spectroscopy for chemical analysis ("ESCA") spectra for coated surfaces made using the Example 5 fluoropolymer (FIG. 3a), fluororesin (FIG. 3b), and the Example 5 coating before (FIG. 3c) and after (FIG. 3d) rubbing.
Figure 3B:
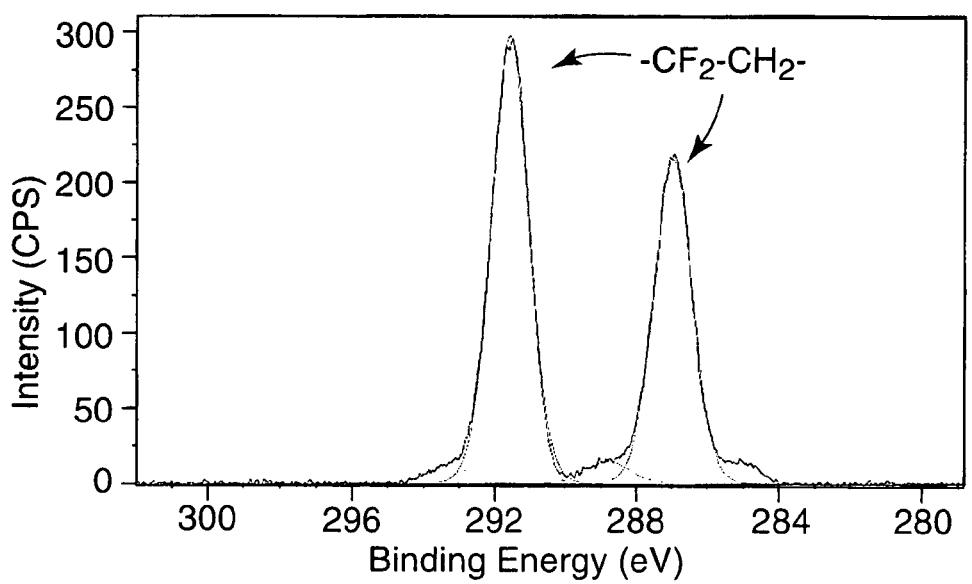
Figure 3C:
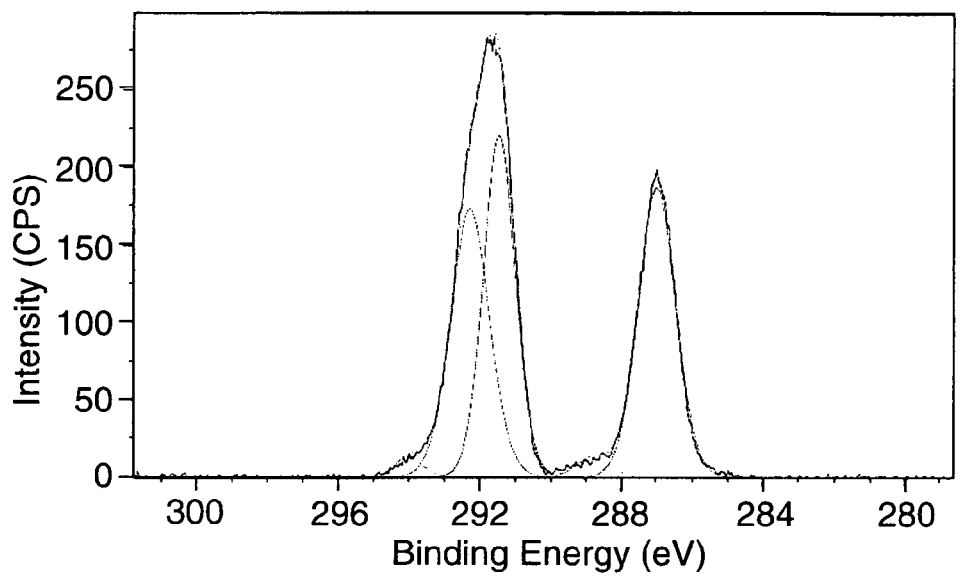
Figure 3D:
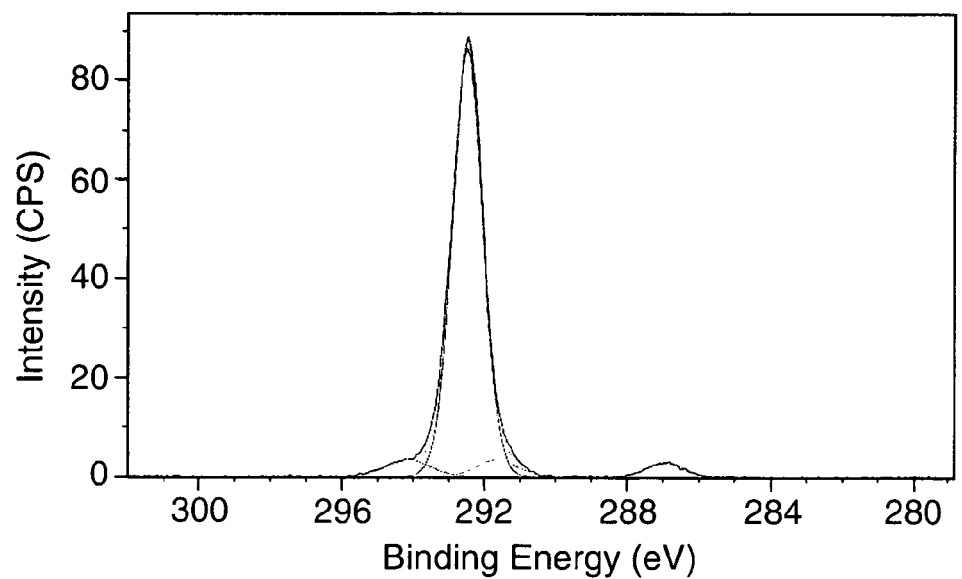

In order to further demonstrate a change in the surface composition after rubbing, electron spectroscopy for chemical analysis ("ESCA") spectra were obtained by analyzing the uppermost 80 Å of coated surfaces prepared from PTFE-J fluoropolymer (FIG. 3a) and PVDF-A fluororesin (FIG. 3b). ESCA spectra were also obtained for the Example 5 coating before (FIG. 3c) and after (FIG. 3d) rubbing. Comparison of FIG. 3a, FIG. 3b, FIG. 3c and FIG. 3d shows that the unrubbed sample in FIG. 3c exhibited peaks at about 292 and 287 eV indicating the presence of both —$CF_2CF_2$— groups from the fluoropolymer (see FIG. 3a) and —$CF_2CH_2$— groups from the fluororesin (see FIG. 3b). FIG. 3d shows that after rubbing, the surface was very depleted in —$CF_2CH_2$— groups (in this instance, sufficient to essentially completely deplete the surface of such groups) and very enriched in —$CF_2CF_2$— groups (in this instance, sufficient to provide an apparently continuous layer containing such groups).

EXAMPLE 6 AND COMPARISON EXAMPLES 1-11

Using the methods of Examples 1-5, coating compositions were prepared and applied to PET supports (and in some cases noted below, also or instead applied to PET-H supports). In some instances (also noted below), the coating compositions were modified by adding varying amounts of silane, acrylate or photoinitiator. Some coating compositions were made without photoinitiator but employed cure site monomers or other ingredients that permitted curing to take place in the absence of a separately-added photoinitiator. The coatings were photocured using 3 (or where noted below, 6) passes under the Example 1 UV lamp. The coatings were evaluated for one or more of peel strength, resistance to immersion in boiling water or manual abrasion resistance. Set out below in Table I are the Run Numbers, coating composition solid ingredients, and the results for peel strength, qualitative bond strength after boiling water immersion or qualitatively observed manual abrasion resistance. In some instances the listed ingredient amounts add up to more than 100 parts.

TABLE I

| Run No. | Fluoropolymer (parts) | Binder (parts) | Additives (parts) | Peel Strength, Kg/mm width | Qualitative Adhesion After Boiling Water Immersion | Extent of Scratching (Manual Abrasion Resistance) | Remarks |
|---|---|---|---|---|---|---|---|
| 6-1 | PFA-A (20) | FKM-A (80) | | | Delaminated | | |
| 6-2 | PFA-A (20) | FKM-A (80) | A1106 (5) | 0.05 | | | 0.03 Kg/mm width peel strength on PET-H support |
| 6-3 | PFA-A (20) | FKM-A (80) | DMAPS (5) TMPTA (5) | 0.03 | | | 0.04 Kg/mm width peel strength on PET-H support |
| 6-4 | PFA-A (20) | FKM-A (80) | DMAPS (5) TMPTA (5) | 0.04 | | | 6 UV passes |
| 6-5 | PFA-A (20) | FKM-A (80) | DMAPS (5) TMPTA (5) | 0.02 | | | PET-H support, 6 UV passes |
| 6-6 | PFA-A (20) | FKM-A (80) | APTMS (5) TMPTA (5) | 0.05 | | | PET-H support, 6 UV passes |

TABLE I-continued

| Run No. | Fluoropolymer (parts) | Binder (parts) | Additives (parts) | Peel Strength, Kg/mm width | Qualitative Adhesion After Boiling Water Immersion | Extent of Scratching (Manual Abrasion Resistance) | Remarks |
|---|---|---|---|---|---|---|---|
| 6-7 | PFA-A (20) | FKM-A (80) | PAPTMS (5) TMPTA (5) | 0.04 | | | PET-H support, 6 UV passes |
| 6-8 | PFA-A (20) | FKM-A (80) | A1106 (5) A174 (5) I651 (1) | | | Slight | |
| 6-9 | PFA-A (19) | FKM-A (76) | TMPTA (5) I651 (1) | | | Slight | |
| 6-10 | PFA-A (18) | FKM-A (72) | TMPTA (5) A1106 (5) I651 (1) | | Strong | None | Similar adhesion on PET-H support |
| 6-11 | PFA-A (18) | FKM-A (72) | TMPTA (5) HFPO-A (5) A1106 (5) I651 (1) | | | None | |
| 6-12 | PFA-A (16) | FKM-A (64) | TMPTA (5) HFPO-A (5) HFPO-B (5) A1106 (5) I651 (1) | | | None | |
| 6-13 | PFA-A (18) | FKM-A (72) | VS (5) A1106 (5) I651 (1) | | | None | |
| 6-14 | PFA-A (17) | FKM-A (68) | HFPO-A (5) HFPO-B (5) A1106 (5) I651 (1) | | | None | |
| 6-15 | PFA-A (12) | FKM-A (68) | TMPTA (5) HFPO-A (5) HFPO-B (5) A1106 (5) I651 (1) | | | None | |
| 6-16 | PFA-A (10) | FKM-A (90) | TMPTA (5) HFPO-A (5) HFPO-B (5) A1106 (5) I651 (1) | | | None | |
| 6-17 | PFA-A (7.5) | FKM-A (92.5) | TMPTA (5) HFPO-A (5) HFPO-B (5) A1106 (5) I651 (1) | | | Very Slight | |
| 6-18 | PFA-A (5) | FKM-A (95) | TMPTA (5) HFPO-A (5) I651 (1) | | | Very Slight | |
| 6-19 | PTFE-A (20) | FKM-A (80) | | | Moderate | | |
| 6-20 | PTFE-A (19) | FKM-A (76) | A1106 (5) | | Strong | | Similar adhesion on PET-H support |
| 6-21 | PTFE-A (19) | FKM-A (76) | A1106 (5) I651 (1) | | | None | |
| 6-22 | PTFE-A (19) | FKM-A (76) | TMPTA (5) I651 (1) | | | None | |
| 6-23 | PTFE-A (17) | FKM-A (68) | TMPTA (5) HFPO-A (5) A1106 (5) I651 (1) | | | None | |
| 6-24 | PTFE-A (17) | FKM-A (68) | HFPO-A (5) HFPO-B (5) A1106 (5) I651 (1) | | | None | |
| 6-25 | PTFE-A (18) | FKM-A (72) | VS (5) A1106 (5) I651 (1) | | | None | |
| 6-26 | PTFE-A (18) | FKM-A (72) | A174 (5) A1106 (5) I651 (1) | | | Slight | |
| 6-27 | PTFE-A (16) | FKM-A (64) | TMPTA (5) HFPO-A (5) HFPO-B (5) A1106 (5) I651 (1) | | | None | |

TABLE I-continued

| Run No. | Fluoropolymer (parts) | Binder (parts) | Additives (parts) | Peel Strength, Kg/mm width | Qualitative Adhesion After Boiling Water Immersion | Extent of Scratching (Manual Abrasion Resistance) | Remarks |
|---|---|---|---|---|---|---|---|
| 6-28 | PTFE-A (12) | FKM-A (68) | TMPTA (5) HFPO-A (5) HFPO-B (5) A1106 (5) I651 (1) | | | None | |
| 6-29 | PTFE-A (8) | FKM-A (72) | TMPTA (5) HFPO-A (5) HFPO-B (5) A1106 (5) I651 (1) | | | None | |
| 6-30 | PTFE-A (6) | FKM-A (74) | TMPTA (5) HFPO-A (5) HFPO-B (5) A1106 (5) I651 (1) | | | Very Slight | |
| 6-31 | PTFE-A (4) | FKM-A (76) | TMPTA (5) HFPO-A (5) HFPO-B (5) A1106 (5) I651 (1) | | | Slight | |
| 6-32 | PFA-A (20) | THV-A (80) | A1106 (5) | 0.12 | | | 0.03 Kg/mm width peel strength on PET-H support |
| 6-33 | PFA-A (20) | THV-A (80) | DMAPS (5) | 0.09 (ripped) | | | 0.04 Kg/mm width peel strength on PET-H support |
| 6-34 | PFA-A (20) | THV-A (80) | DMAPS (5) | 0.08 (ripped) | | | 6 UV passes; 0.07 Kg/mm width peel strength on PET-H support |
| 6-35 | PFA-A (19) | THV-A (76) | A1106 (5) | | | None | |
| 6-36 | PFA-A (9.5) | THV-A (85.5) | A1106 (5) | | | Slight | |
| 6-37 | PFA-A (4.75) | THV-A (90.25) | A1106 (5) | | | Slight | |
| 6-38 | PFA-A (18) | THV-A (72) | TMPTA (5) A1106 (5) | | | None | |
| 6-39 | PFA-A (9) | THV-A (81) | TMPTA (5) A1106 (5) | | | None | |
| 6-40 | PFA-A (4.5) | THV-A (85.5) | TMPTA (5) A1106 (5) | | | Slight | |
| 6-41 | TFE-A (20) | THV-A (80) | TMPTA (5) A1106 (2) I651 (1) | 0.08 | | | 0.04 Kg/mm width peel strength (ripped) on PET-H support |
| 6-42 | TFE-A (20) | THV-A (80) | A1106 (5) | | | None | |
| 6-43 | TFE-A (9.5) | THV-A (85.5) | A1106 (5) | | | Slight | |
| 6-44 | TFE-A (4.75) | THV-A (90.25) | A1106 (5) | | | Slight | |
| 6-45 | TFE-A (18) | THV-A (72) | TMPTA (5) A1106 (5) I651 (1) | | | None | |
| 6-46 | TFE-A (9) | THV-A (81) | TMPTA (5) A1106 (5) I651 (1) | | | None | |
| 6-47 | TFE-A (4.5) | THV-A (85.5) | TMPTA (5) A1106 (5) I651 (1) | | | Slight | |
| 6-48 | TFE-A (20) | PVDF-A (80) | | | | Slight | |
| 6-49 | TFE-A (19) | PVDF-A (76) | A1106 (5) | | | None | |
| 6-50 | TFE-A (18) | PVDF-A (72) | TMPTA (5) A1106 (5) | | | None | |
| 6-51 | TFE-A (28.5) | PVDF-A (66.5) | A1106 (5) | | | None | |
| 6-52 | TFE-A (47.5) | PVDF-A (47.5) | A1106 (5) | | | None | Slight haze |
| 6-53 | TFE-A (80) | PVDF-A (20) | | | | None | Slight haze |
| 6-54 | TFE-A (76) | PVDF-A (19) | A1106 (5) | | | None | Slight haze |

TABLE I-continued

| Run No. | Fluoropolymer (parts) | Binder (parts) | Additives (parts) | Peel Strength, Kg/mm width | Qualitative Adhesion After Boiling Water Immersion | Extent of Scratching (Manual Abrasion Resistance) | Remarks |
|---|---|---|---|---|---|---|---|
| Comp. 1 | | FKM-A (97) | TMPTA (5) HFPO-A (5) HFPO-B (5) A1106 (3) I651 (1) | | | Scratched | |
| Comp. 2 | | THV-A (100) | | | | | Coating peeled off and did not adhere |
| Comp. 3 | | THV-A (95) | A1106 (5) | | | None | |
| Comp. 4 | | THV-A (95) | VS (5) A1106 (5) | | | Scratched | |
| Comp. 5 | | THV-A (95) | A1106 (5) A174 (5) | | | Scratched | |
| Comp. 6 | | PVDF-A (100) | | | Delaminated | | |
| Comp. 7 | | PVDF-A (100) | | | Strong | | PET-H support |
| Comp. 8 | | PVDF-A (95) | A1106 (5) | | Good | | |
| Comp. 9 | | PVDF-A (95) | A1106 (5) | | Good | | PET-H support |
| Comp. 10 | | PVDF-A (95) | TMPTA (5) A1106 (5) I651 (1) | 0.11 (ripped) | | | |
| Comp. 11 | | PVDF-A (95) | TMPTA (5) A1106 (5) I651 (1) | 0.05 (ripped) | | | PET-H support |

Figure 4A:
FIG. 4 is an atomic force microscopy photomicrograph showing the height image (left side) and phase image (right side) for the Example 6, Run No. 6-53 coating after rubbing.
Figure 4B:
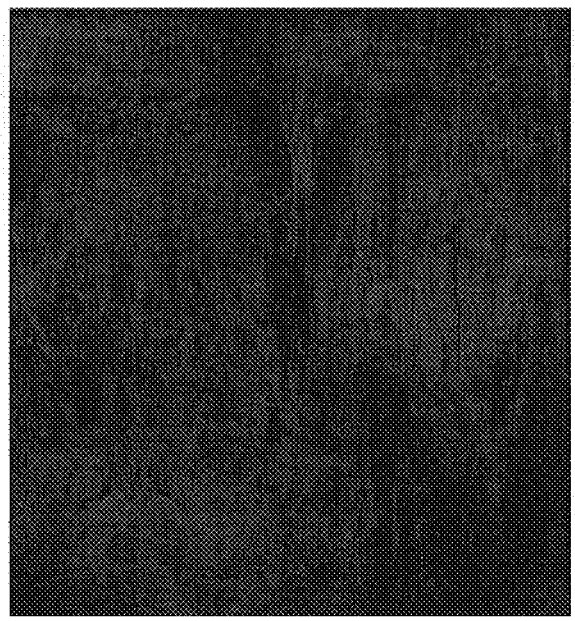

The data in Table I shows that the disclosed compositions could be formulated and applied using varying amounts of each ingredient and using a variety of ingredients. A variety of durable, clear scratch-resistant coatings were obtained. When rubbed, they provided coated articles bearing a continuous or nearly continuous fluoropolymer layer having a micrometer- or nanometer-scale thickness dimension governed by the sizes and amounts of the fluoropolymer particles. For example, FIG. 4 is an atomic force microscopy photomicrograph showing the height image (left side) and phase image (right side) for the Run No. 6-53 coating (80 parts TFE-A fluoropolymer particles and 20 parts PVDF-A fluoroelastomer) after rubbing, showing that a continuous fluoropolymer layer was formed. Adhesion values for coatings applied to a PET-H support were usually the same as or somewhat lower than for coatings applied to the PET support.

The composition of Run No. 6-10 was coated on a PET support and heated for 1, 3 or 5 minutes at 120° C. followed by photocuring under the Example 1 UV lamp using 1, 3 or 6 passes. The coated films were stored overnight at room temperature and then evaluated for Mechanical Abrasion Resistance. Reduced scratching was observed when using longer heating times or more UV passes.

EXAMPLE 7

Using the method of Examples 1-4, a series of thermally-curable coating compositions was prepared. The compositions were applied to a PET support and cured for 3 minutes at 150° using the method of Example 3. The cured coatings were evaluated for manual abrasion resistance. Set out below in Table II are the Run Numbers, coating composition solid ingredients and test results. In some instances the listed ingredient amounts add up to more than 100 parts.

TABLE II

| Run No. | Fluoropolymer (parts) | Binder (parts) | Additives (parts) | Extent of Scratching (Manual Abrasion Resistance) |
|---|---|---|---|---|
| 7-1 | PFA-B (10) | FKM-A (90) | A1106 (5) TAIC (1) DIADC (1) | None |
| 7-2 | PFA-B (20) | FKM-A (80) | A1106 (5) TAIC (1) DIADC (1) | None |
| 7-3 | PFA-B (10) | FKM-A (90) | A1106 (5) TAIC (1) BPB (1) | None |
| 7-4 | PFA-B (20) | FKM-A (80) | A1106 (5) TAIC (1) BPB (1) | None |
| 7-5 | PFA-B (10) | FKM-A (90) | A1106 (5) TMPTA (1) DIADC (1) | None |
| 7-6 | PFA-B (20) | FKM-A (80) | A1106 (5) TMPTA (1) DIADC (1) | None |
| 7-7 | PTFE-A (10) | FKM-B (90) | A1106 (5) TAIC (1) DIADC (1) | None |
| 7-8 | PTFE-A (20) | FKM-B (80) | A1106 (5) TAIC (1) DIADC (1) | None |
| 7-9 | PTFE-A (10) | FKM-B (90) | A1106 (5) TAIC (1) BPB (1) | None |
| 7-10 | PTFE-A (20) | FKM-B (80) | A1106 (5) TAIC (1) BPB (1) | None |
| 7-11 | PTFE-A (10) | THV-B (90) | A1106 (5) | None |
| 7-12 | PTFE-A (20) | THV-B (80) | A1106 (5) | None |

EXAMPLE 8

Using the method of Example 6, coating compositions were prepared and applied to a PET support. The coatings were evaluated for sand abrasion resistance or mechanical scratch resistance. Set out below in Table III are the Run Numbers, coating composition solid ingredients and test results. In some instances the listed ingredient amounts add up to more than 100 parts.

EXAMPLE 9

Using the method of Example 1, photocurable compositions having a variety of refractive indices were prepared. The compositions were applied to a PET support and cured using the method of Example 1. Set out below in Table V are the Run Numbers, coating composition solid ingredients and cured coating refractive index values. In some instances the listed ingredient amounts add up to more than 100 parts.

TABLE III

| Run No. | Fluoropolymer (parts) | Binder (parts) | Additives (parts) | Sand Abrasion Resistance, $\Delta R$, % | Mechanical Scratch Resistance, 500 μm tip (g preload) | Mechanical Scratch Resistance, 5 mm tip (g preload) |
|---|---|---|---|---|---|---|
| 8-1 | PFA-A (17.4) | FKM-A (65.2) | TMPTA (4.3) HFPO-A (4.3) HFPO-B (4.3) A1106 (4.3) I651 (1) | — | 0 (350 g) | 0 (1000 g) |
| 8-2 | PFA-A (8.7) | FKM-A (73.9) | TMPTA (4.3) HFPO-A (4.3) HFPO-B (4.3) A1106 (4.3) I651 (1) | — | 0 (350 g) | 0 (1000 g) |
| 8-3 | PFA-A (4.3) | FKM-A (78.3) | TMPTA (4.3) HFPO-A (4.3) HFPO-B (4.3) A1106 (4.3) I651 (1) | — | 2 (250 g) | 7 (300 g) |
| 8-4 | PFA-A (9.1) | FKM-A (81.8) | TMPTA (4.3) A1106 (4.3) I651 (1) | −8% | 0 (350 g) | 0 (1000 g) |
| 8-5 | PFA-A (9.5) | FKM-A (85.7) | A1106 (4.3) I651 (1) | −38% | 1 (350 g) | 0 (1000 g) |
| 8-6 | PFA-A (9.5) | FKM-A (85.7) | TMPTA (4.7) I651 (1) | −104% | 2 (350 g) | 0 (1000 g) |

The results in Table III demonstrate very good sand abrasion resistance or mechanical scratch resistance. Run Nos. 8-1, 8-2 and 8-4 exhibited especially good performance. The Run No. 8-4 coating was tested further to evaluate advancing and receding contact angles for water and hexadecane before and after rubbing the coating, and after carrying out the sand abrasion test. The results are shown below in Table IV:

TABLE IV

| | | Contact Angle, degrees | | |
|---|---|---|---|---|
| Conditions | Liquid | Static | Advancing | Receding |
| Before rubbing | Water | 102 | 120 | 57 |
| Before rubbing | Hexadecane | | 65 | 41 |
| After rubbing | Water | 96 | 113 | 84 |
| After rubbing | Hexadecane | | 53 | 32 |
| After sand abrasion test | Water | 96 | 116 | 62 |
| After sand abrasion test | Hexadecane | | 53 | 38 |

The results in Table IV show that rubbing the coating tended to reduce the static and advancing contact angles, and show that the coating retained its surface properties even after being subjected to the stringent conditions in the sand abrasion resistance test.

TABLE V

| Run No. | Fluoropolymer (parts) | Binder (parts) | Additives (parts) | Refractive Index |
|---|---|---|---|---|
| 9-1 | PFA-A (19) | FKM-A (76) | HFPO-A (10) HFPO-B (10) A1106 (5) I651 (1) | 1.356 |
| 9-2 | PFA-A (19) | FKM-A (76) | TMPTA (10) HFPO-A (10) A1106 (5) I651 (1) | 1.364 |
| 9-3 | PFA-A (19) | FKM-A (76) | HFPO-B (5) A174 (5) A1106 (5) I651 (1) | 1.382 |

COMPARISON EXAMPLE 12

Using a procedure generally similar to that in Example 1 of JP 01-182388, 4 parts PFA-A fluoropolymer particles were dispersed in 16 parts MEK and shaken to provide a dispersion containing 20 wt. % PFA particles. The dispersion had a propensity to settle out if allowed to stand, and did not appear to be a solution. Separately, 2 parts FKM-A fluorine rubber were dissolved in 8 parts MEK by shaking to provide a solution containing 20% fluororesin. The fluoropolymer particle dispersion was remixed, combined with the fluororesin solution and mixed by shaking overnight using a paint shaker. The mixture was inspected the following day. A small amount of precipitate (believed to be fluoropolymer particles) was visible, and more precipitate appeared after the mixture was allowed to stand overnight. The mixture was not homogeneous or storage-stable.

COMPARISON EXAMPLE 13

Equal portions of PFA-A fluoropolymer particles and FKM-A fluororesin were milled together at 66° C. using a two-roll mill. The resulting milled blend was mixed into MEK but did not dissolve or disperse and did not provide a homogeneous, storage-stable mixture.

All references cited herein are expressly incorporated herein by reference in their entirety into this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the invention is not to be limited only by the claims provided below.

We claim:

1. A method for making a fluoropolymer coating composition, the method comprising:
   blending a latex containing crystalline submicron fluoropolymer particles with a latex containing less crystalline or amorphous fluororesin particles:
   coagulating and drying the blended lattices to form a dried blend; and
   contacting the dried blend with a solvent that dissolves the fluororesin particles to form a dispersion of the fluoropolymer particles in a solvent-borne solution of fluororesin, wherein the solvent is selected from ketone, ether, ester, cyclic ester, or combination thereof.

2. A method according to claim 1 comprising coagulating the lattices by chilling.

3. A method according to claim 1 further comprising forming an applied layer by applying a layer of the dispersion to a support and hardening or curing the applied layer to form a hardened or cured layer.

4. A method according to claim 3 further comprising rubbing, buffing, polishing or otherwise disturbing the hardened or cured layer to form a thin, continuous or nearly continuous fluoropolymer surface layer atop a less crystalline or amorphous fluororesin binder layer containing crystalline submicron fluoropolymer particles.

5. A method according to claim 1 wherein the fluoropolymer particles comprise perfluoropolymer particles.

6. A method according to claim 1 wherein the fluoropolymer particles comprise a homopolymer of tetrafluoroethylene, polymer of tetrafluoroethylene and perfluoro(propyl vinyl ether) or polymer of tetrafluoroethylene and hexafluoropropylene.

7. A method according to claim 1 wherein the fluoropolymer particles have an average particle diameter between about 50 and about 200 nm.

8. A method according to claim 1 wherein the fluororesin comprises a fluorothermoplastic.

9. A method according to claim 1 wherein the fluororesin comprises polyvinylidene fluoride, a polymer of tetrafluoroethylene, hexafluoropropylene and vinylidene fluoride, a polymer of tetrafluoroethylene and vinylidene fluoride or a polymer of tetrafluoroethylene and hexafluoropropylene.

10. A method according to claim 1 wherein the dispersion comprises about 5 to about 60 weight percent fluoropolymer solids and about 95 to about 40 weight percent fluororesin solids, not counting solvent.

11. A method according to claim 1 wherein the dispersion is storage-stable such that it remains homogeneous when stored for at least one week at room temperature in a sealed container.

12. A method according to claim 11 wherein the dispersion remains homogeneous when stored for at least one month at room temperature in a sealed container.

13. A method according to claim 1 wherein the dispersion contains less than 10 wt. % of water or organic liquids that cannot alone dissolve the fluororesin.

14. A method according to claim 3 wherein the hardened or cured layer is a transparent, non-hazy coating.

15. A method according to claim 3 wherein the dispersion is sufficiently free of pigments or other opacifiers so as provide a transparent optical coating after hardening or curing.

16. A method according to claim 1 wherein the dispersion further comprises an adhesion promoting agent.

17. A method according to claim 16 wherein the adhesion promoting agent comprises an aminosilane.

18. A method according to claim 1 wherein the dispersion further comprises a crosslinker.

19. A method according to claim 1 wherein the dispersion further comprises a multi-(meth)acrylate or mono-(meth)acrylate derivative of hexafluoropropylene oxide.

20. A method according to claim 4 wherein the fluoropolymer surface layer is continuous.

21. A method according to claim 4 wherein the fluoropolymer surface layer has a micrometer- or nanometer-scale thickness dimension governed by the sizes and amounts of the fluoropolymer particles.

22. A method according to claim 4 wherein the fluoropolymer surface layer provides a low friction surface, hydrophobic surface, oleophobic surface or light management structure.

23. A method according to claim 22 wherein the light management structure is antireflective.

24. A method according to claim 4 wherein the fluoropolymer surface layer and fluororesin binder layer are substantially pigment- and opacifier-free and provide a transparent coating.

25. A method according to claim 4 wherein the fluoropolymer surface layer and fluororesin binder layer cover at least a portion of a display viewing surface that is susceptible to damage.

* * * * *

UNITED STATES PATENT AND TRADEMARK OFFICE
CERTIFICATE OF CORRECTION

PATENT NO. : 7,638,581 B2 Page 1 of 1
APPLICATION NO. : 11/305978
DATED : December 29, 2009
INVENTOR(S) : Jing et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 805 days.

Signed and Sealed this

Ninth Day of November, 2010

David J. Kappos
*Director of the United States Patent and Trademark Office*